United States Patent [19]

Varga

[11] 4,186,916
[45] Feb. 5, 1980

[54] PRECISION WORKPIECE POSITIONING MEANS FOR MACHINE TOOLS

[75] Inventor: Paul Varga, Salisbury, Md.

[73] Assignee: Salisbury Special Tool, Salisbury, Md.

[21] Appl. No.: 943,144

[22] Filed: Sep. 18, 1978

[51] Int. Cl.² ............................................. B23Q 3/00
[52] U.S. Cl. ..................................... 269/303; 269/315
[58] Field of Search ................... 269/303, 315, 10, 99, 269/291, 297–301, 303–306, 315–319, 48.1

[56] References Cited

U.S. PATENT DOCUMENTS

| 2,226,078 | 12/1940 | Spahn | 269/48.1 |
|---|---|---|---|
| 3,554,530 | 1/1971 | Moore | 269/301 |
| 4,045,010 | 8/1977 | Arnold | 269/315 |

*Primary Examiner*—Robert C. Watson
*Attorney, Agent, or Firm*—Newton, Hopkins & Ormsby

[57] ABSTRACT

A precision workpiece positioner in the form of a rectangular parallelepiped has divided extensions projecting beyond one surface thereof for entry into the mouth of a locator slot in a machine tool table. Tapered expanders spread the divided extensions into positive engagement with the mouth of the slot. A screw engaged with the workpiece positioner draws a T-nut into tight locking engagement with the table which has a T-cross section. The positioner may be used in association with a workpiece clamp or plural positioners engaged in parallel table slots can align longer workpieces for machining.

12 Claims, 6 Drawing Figures

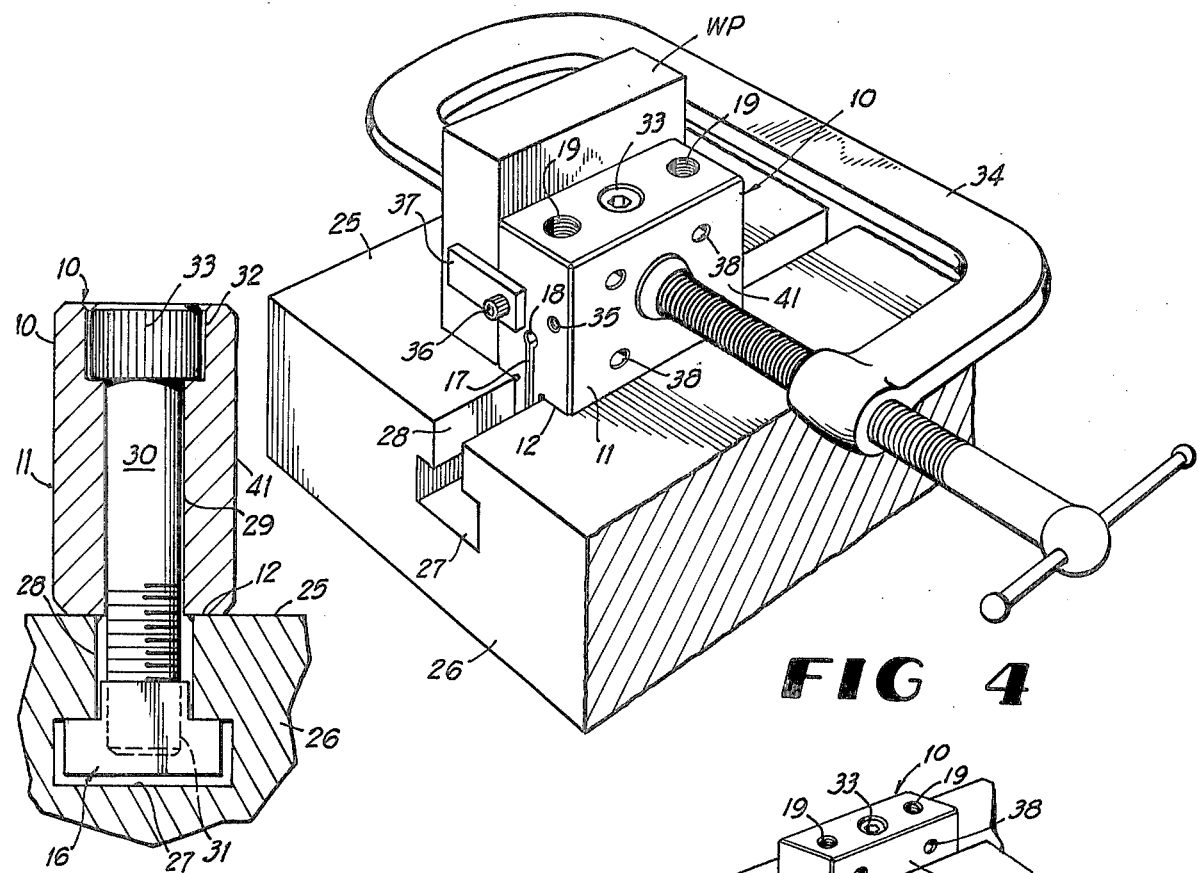
FIG 3A
FIG 4
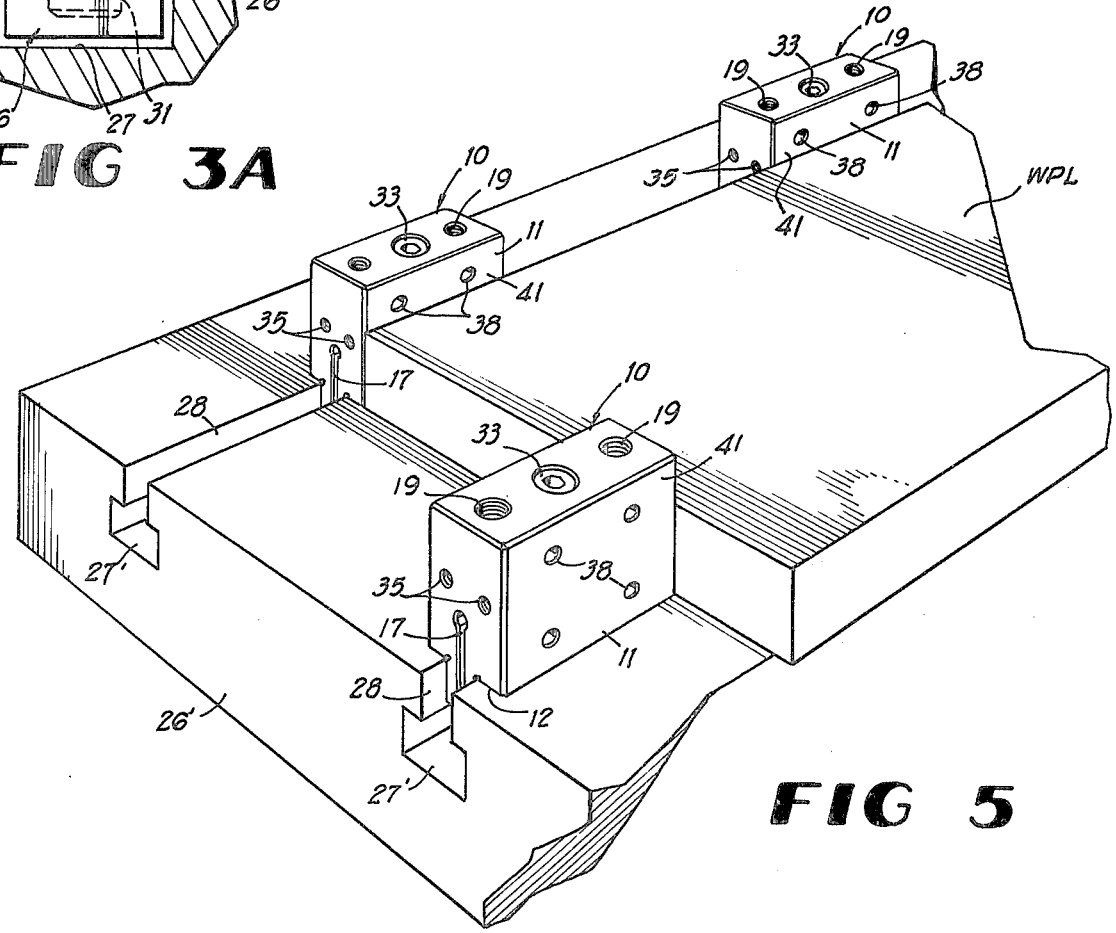
FIG 5

PRECISION WORKPIECE POSITIONING MEANS FOR MACHINE TOOLS

BACKGROUND OF THE INVENTION

The invention seeks to satisfy the need for a more precise and reliable positive positioning means for workpieces held on tables of machine tools, such as milling machines, jig bores, grinders, etc. In the prior art, various workholders and positioners have been devised to meet particular needs. In many cases, the prior art devices are complex and unduly costly and have to be customized to satisfy particular machining operations. Therefore, they lack the flexibility necessary for repeated or wide usage in machining operations and are frequently inconvenient to set up on a machine tool table, such as the table of a milling machine. Some examples of the known prior art are contained in the following U.S. Pat. Nos. which are made of record herein to satisfy the requirements for disclosure under 37 C.F.R. 1.56:

521,802  1,914,542
882,943  3,124,180
1,234,176  3,704,880

SUMMARY OF THE INVENTION

The invention provides one or more precisely formed rectangular parallelepipeds whose side and end faces are utilized to position workpieces in parallelism with a machine tool table travel axis and in perpendicular relationship with the flat supporting surface of the table. Each parallelepiped therefore constitutes a precision workpiece positioner and each such positioner has an integral divided extension on one face thereof which can be expanded by means of threaded tapered expander elements into internal gripping engagement with the mouth of a table slot formed parallel to the table movement axis. Another threaded element engaged with workpiece positioner draws a T-nut into tight locking engagement with the main passageway of the slot which is of T-cross section, whereby the positioner can be placed anywhere along the length of the slot and securely locked. Additional openings in the positioner allow the use of work stop elements on the primary positioner and thus increase its versatility. A single positioner may be used with a C-clamp to secure a workpiece for machining on a machine tool table. Plural positioners can be placed in parallel table slots to locate longer workpieces precisely for milling, jig boring or the like.

BRIEF DESCRIPTION OF THE DRAWINGS

FIG. 3a is a fragmentary cross section, similar to FIG. 3, taken on line 3a—3a of FIG. 2.

FIG. 4 is a perspective view illustrating the use of the workpiece positioner in conjunction with a machine tool table and clamp, the table being shown partly in section.

FIG. 5 is a similar perspective view illustrating the use of plural workpiece positioners in conjunction with a machine tool table having two parallel locator slots.

DETAILED DESCRIPTION

Figure 1:
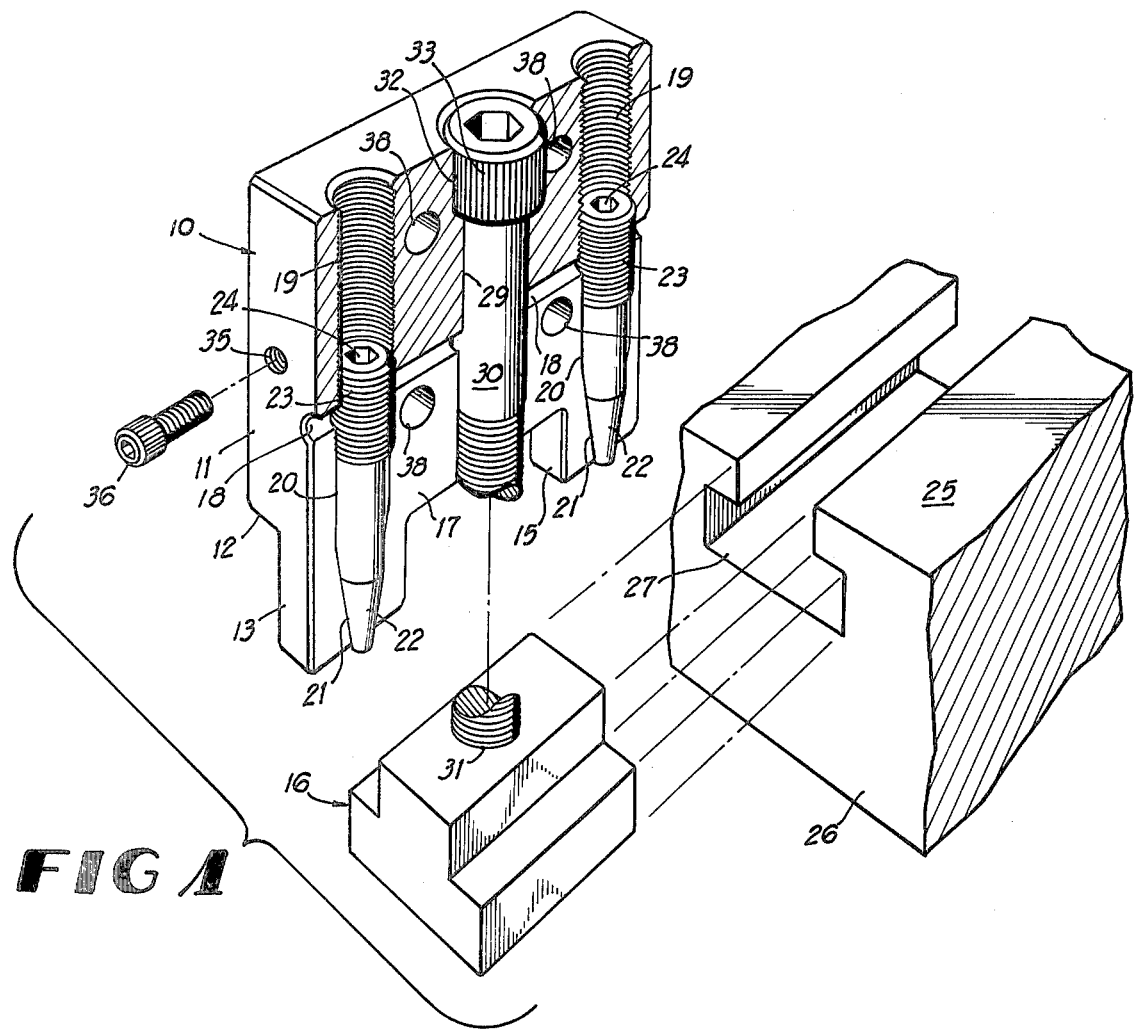
FIG. 1 is an exploded perspective view, partly in cross section, showing a precision workpiece positioner for machine tools embodying the invention.

Referring to the drawings in detail wherein like numerals designate like parts, the numeral 10 designates a precision workpiece positioner which is accurately milled, ground and scraped to very close tolerances and very smooth surfaces. The body portion 11 of the positioner is in the form of a rectangular parallelepiped whose corners are chamfered, as illustrated. The side, end and bottom surfaces of the body portion 11 are precisely perpendicular to one another.

Figure 2:
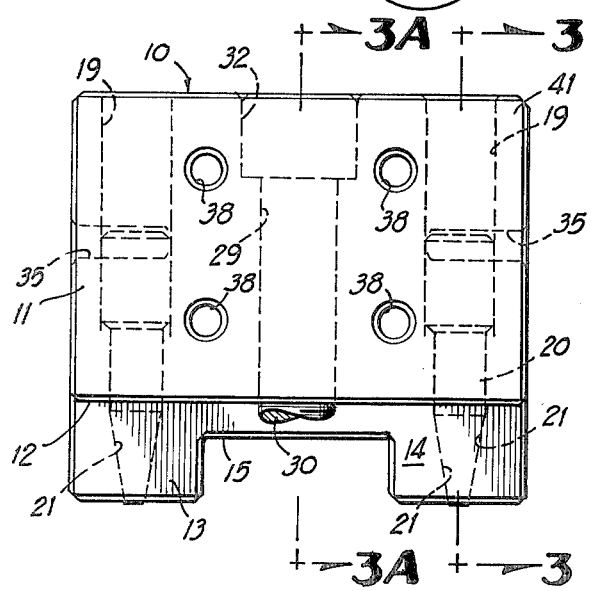
FIG. 2 is a side elevational view of the positioner, partly broken away.
Figure 3:
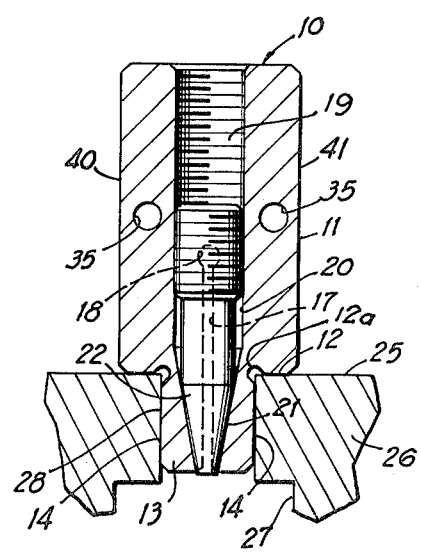
FIG. 3 is a vertical section taken on line 3—3 of FIG. 2 and also showing in cross section a portion of an associated machine tool table.

Below the bottom flat surface 12 of the locator body portion 11 and at its transverse center, FIG. 3, a reduced width integral extension 13 is formed dependingly on the body portion in integral relationship therewith. The extension 13 is centered laterally with the body portion 11, FIG. 3, and has side faces 14 which are parallel to the side faces of the body portion 11. There is a longitudinal under cut clearance 12a throughout the length of the intersection of each face 14 and its associated surface 12. The extension 13 is recessed at 15, FIG. 2, for a substantial distance midway between the end faces of the body portion to provide clearance for a locking or clamping T-nut 16, to be further described.

The positioner 10 is longitudinally divided through its bottom including the extension 13 by a laterally centered narrow slot 17 having a relief opening 18 at the top of the slot 17 extending entirely through the body portion 11 from end face to end face thereof. The top of the slot 17 defined by the relief opening 18 is near the height center of the workpiece positioner.

Near and inwardly of its ends, the positioner 10 is provided through its top face with parallel threaded openings 19 leading downwardly to unthreaded bores 20 which further lead to tapered bore portions 21 whose lower narrow ends open through the bottom face of the depending extension 13. Tapered expander pins 22 are received in the bore portions 21 and upper threaded portions 23 of the expander pins are engaged in the threaded bores 19 and have sockets 24 in their tops to receive a wrench for turning. Downward displacement of the pins 22 within the tapered bore portions 21 will cause lateral expansion or spreading of the two halves of the extension 13 on opposite sides of the slot 17.

During the use of the workpiece positioner, FIGS. 4 and 5, the bottom face 12 of body portion 11 rests on the top flat surface 25 of a machine tool table 26, such as the table of a milling machine. Such table is equipped along its movement axis with either a single T-cross section locator slot 27, FIG. 4, or a pair of parallel slots 27', FIG. 5. Each slot has a somewhat restricted mouth 28 opening through the top surface of the table. The reduced width depending extension 13 of the workpiece positioner enters the mouth 28 of the table T-slot, as illustrated, with the lower face 12 against the table top surface 25. Downward turning of the expander pins 22 in the threaded bores 19 will spread or expand the opposite side faces 14 of extension 13 into internal gripping relation with the mouth 28 of the T-slot.

The body portion 11 is further provided in its top midway between the threaded bores 19 and at its transverse center with a through bore 29 adapted to receive a locking bolt 30 having its lower threaded end engaged with the aforementioned T-nut 16, the latter having a threaded bore 31. The axis of bolt 30 is parallel to the axes of expander pins 22. The top of body portion 11 is undercut at 32 to accommodate the somewhat enlarged head 33 of locking bolt 30.

When the bolt 30 is threaded into the bore 31 of T-nut 16 with the latter engaged in T-cross section slot 27, the body portion 11 will be drawn downwardly into firm contact with the top surface 25 of table 26. The combined action of the bolt and T-nut 16 and expander pins 22 will rigidly lock the workpiece positioner 10 to the machine tool table at the desired location along the table slot 27.

FIG. 4 illustrates the use of a single workpiece positioner 10 according to the invention for positioning or holding a block-like workpiece WP in conjunction with a conventional C-clamp 34 which clamps the workpiece against one side face of body portion 11 which is perpendicular to table top surface 25 on one side of the T-slot 27. The body portion 11 is further provided in its opposite end faces with threaded openings 35 receiving mounting screws 36 for work stop elements or plates 37, where such are required or desirable. Further openings 38 are provided in the side faces of body portion 11 to further increase the versatility of the positioner 10. However, the essential and most important features of the invention reside in the provision of a precise body portion 11 with an expandable or spreadable reduced width extension 13 and coacting expander elements 22, in combination with the T-nut 16 and T-nut locking bolt 30, as described. These elements facilitate the precision alignment of the workpiece positioner with the main axis of the table 26 defined by its slot or slots 27 and 27'.

In FIG. 5 of the drawings, a relatively long workpiece WPL is seated on the flat top face of machine tool table 26' having a plurality of spaced parallel T-slots, such as T-slot 27'. One workpiece positioner 10 in FIG. 5 is used as a workpiece stop against one end of the workpiece to prevent displacement thereof on the longitudinal axis of the table. This one positioner 10 is located and locked in one T-slot 27' in the manner fully described in connection with FIGS. 1-3a. Two additional positioners 10 are located and locked in the second slot 27' to align the workpiece WPL precisely along the table movement axis which is parallel to the slots 27'. These illustrations are sufficient to show the versatility of the invention and other arrangements of the precision positioners 10 to meet the needs of particular machining operations are possible as should be readily apparent to one skilled in the art.

The invention is characterized by simplicity, comparative economy, convenience of use, high versatility and high precision. The positioner 10 is positive in its relationship to the machine tool table and workpiece which it serves to align relative to the table.

When the positioner 10 is in place and the expanding pins 20, 22 and the locking bolt 30 are tightened, the positioner 10 is:
(1) positively locked to the table 26;
(2) precisely aligned with the table movement; and
(3) provides parallel work engaging surfaces 40 and 41 which are perpendicular to the table surface 25. The positioner 10 has a unitary body which is quite easily assembled with its associated pins and bolts for many and varied uses either as a single unit or copending with other similar positioners 10.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A precision workpiece positioner for use with machine tools comprising a rectangular parallelepiped body portion adapted to rest on a machine tool workpiece support table, a divided extension of reduced width projecting from one face of said body portion and adapted to enter the mouth of a machine tool table T-slot, adjustable spreader means for said divided extension on the body portion adapted to expand opposite side portions of the extension into gripping engagement with the mouth of the T-slot, a T-nut engageable adjustably into a T-slot of a machine tool workpiece support table below said body portion, and a bolt threadably engaged with the T-nut and engaged rotationally within a passage through said body portion.

2. A precision workpiece positioner as defined in claim 1, and said divided extension being recessed centrally of the body portion to receive a portion of said T-nut nestingly when the T-nut is drawn by said bolt solidly into engagement with a table T-slot to lock the positioner to the table in a selected position of use.

3. A precision workpiece positioner as defined in claim 1, and said adjustable spreader means comprising at least one tapered pin having threaded engagement with said body portion and engaging complementally tapered recesses formed in the interior faces of said divided extension.

4. A precision workpiece positioner as defined in claim 1, and said body portion having a pair of parallel bores extending therethrough and being screw-threaded throughout part of their lengths, said bores being laterally centered relative to the opposing halves of said divided extension and having tapered bore portions formed in the opposing faces of said halves, and a pair of tapered pins engaged within the tapered bore portions and being screw-threaded throughout portions of their lengths and having threaded engagement with the threaded portions of said bores.

5. A precision workpiece positioner as defined in claim 4, and said body portion having another bore formed therethrough between said pair of bores in a common plane therewith and parallel thereto, and said bolt extending through said another bore.

6. A precision workpiece positioner as defined in claim 1, and said body portion having spaced screw-threaded openings at least in its end faces above said divided extension to facilitate the attachment to the body portion of workpiece stop elements above a workpiece supporting machine tool table.

7. A precision workpiece positioner as defined in claim 1, and said divided extension being integrally formed with said body portion by the formation of a narrow slot through the extension and body portion at the lateral center of the body portion and terminating in the body portion near the center of height thereof, and said slot opening through the opposite ends of the body portion and extension.

8. A precision workpiece positioner as defined in claim 7, and the body portion having a relief passage for said slot formed therethrough from end-to-end thereof and intersecting the top of said slot.

9. A precision workpiece positioner as defined in claim 6, and the body portion additionally having spaced utility openings in its side faces perpendicular to said screw-threaded openings.

10. A precision workpiece positioner as defined in claim 1, and said positioner having longitudinal relief grooves at the right angular corners defined by the divided extension and the bottom surface of said body portion.

11. A precision workpiece positioner for machine tools comprising a unitary block body portion of rectangular parallelepiped formation having a centered reduced width mounting extension projecting from one face thereof, said extension and body portion having a relatively narrow slot formed therein centrally thereof and dividing said extension into opposing half sections, said slot terminating within the body portion, adjustable expander means for said half sections carried by said positioner, and means separate from said expander means and engaged with said positioner to couple the same rigidly with a machine tool table.

12. A precision workpiece positioner as defined in claim 11, and said last-named means comprising a through bolt engaged with a through passage in the body portion, and a nut element on said bolt exteriorly of the body portion and being engageable with a complementally shaped machine tool table recess.

* * * * *